No. 812,984. PATENTED FEB. 20, 1906.
W. E. DEMENT.
CATTLE GUARD.
APPLICATION FILED OCT. 12, 1905.
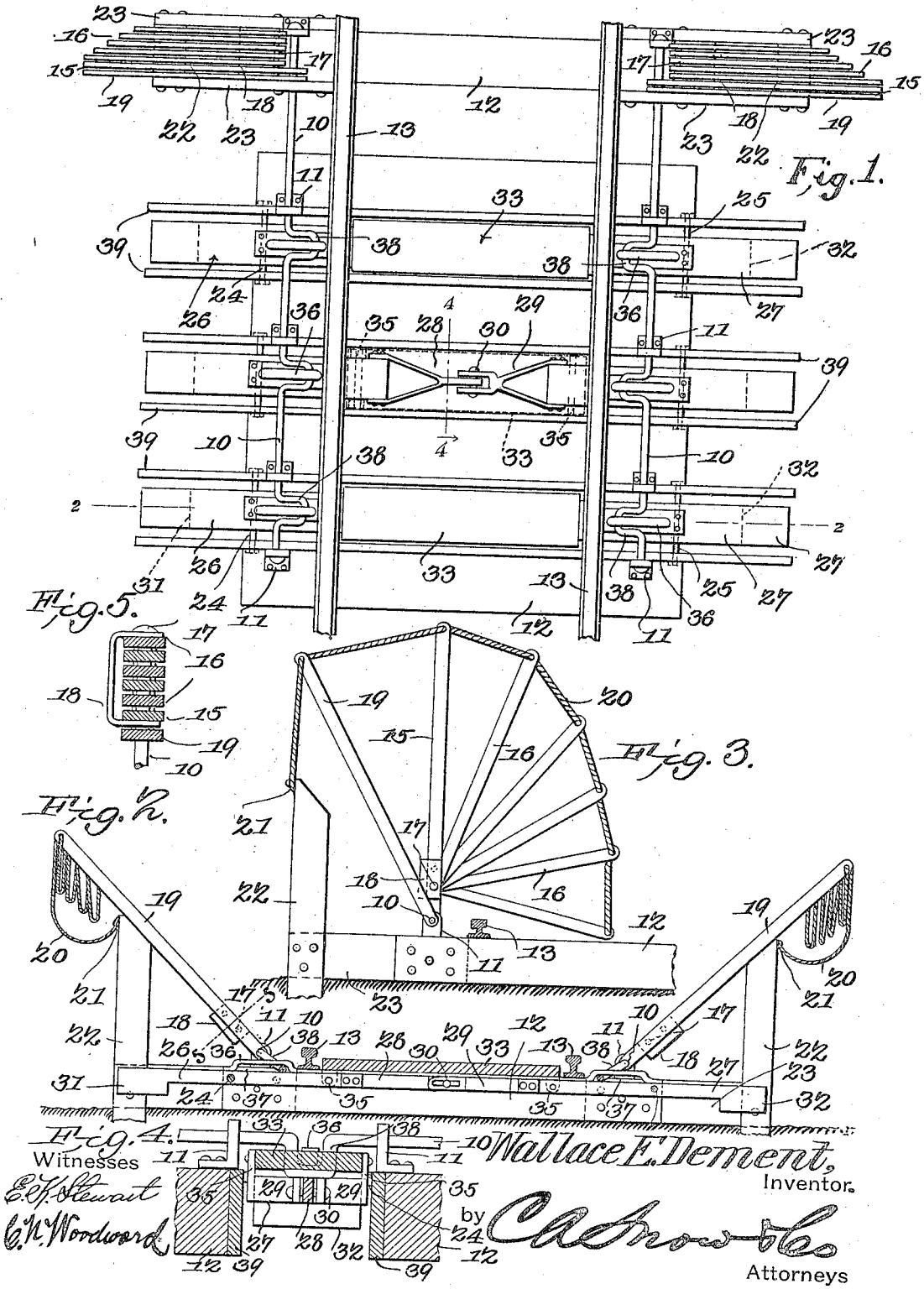

UNITED STATES PATENT OFFICE.

WALLACE E. DEMENT, OF BLAINE, WASHINGTON.

CATTLE-GUARD.

No. 812,984. Specification of Letters Patent. Patented Feb. 20, 1906.

Application filed October 12, 1905. Serial No. 282,467.

*To all whom it may concern:*

Be it known that I, WALLACE E. DEMENT, a citizen of the United States, residing at Blaine, in the county of Whatcom and State of Washington, have invented a new and useful Cattle-Guard, of which the following is a specification.

This invention relates to cattle-guards for railway-tracks, and has for its object to improve the construction and increase the efficiency and utility of devices of this character. The device relates more particularly to devices of this class which operate automatically by the weight of the approaching animal to move a gate transversely of the track and prevent the passage of the animal.

With these and other objects in view, which will appear as the nature of the invention is better understood, the invention consists in certain novel features of construction, as hereinafter fully described and claimed.

In the accompanying drawings, forming a a part of this specification, and in which corresponding parts are denoted by like designating characters, is illustrated the preferred form of the embodiment of the invention capable of carrying the same into practical operation, it being understood that various changes in the form, proportion, and minor details of construction may be resorted to without departing from the principle or sacrificing any of the advantages of this invention within the scope of the appended claims.

In the drawings, Figure 1 is a plan view, and Fig. 2 is an elevation in section, on the line 22 of Fig. 1. Fig. 3 is a detail view illustrating the operation of one of the folding gates. Fig. 4 is an enlarged sectional detail on the line 4 4 of Fig. 1. Fig. 5 is an enlarged sectional detail on the line 5 5 of Fig. 2.

The improved device comprises one or more foldable gates adapted for projection transversely of the tracks, a yieldable platform arranged adjacent to the ties or in the path over which the animals will be compelled to move when approaching the gap which it is desired to protect, and connecting means between the gates and platform whereby the depression of the platform will operate the gates.

Two of the gates will generally be employed, one at each side of the tracks, and extensible inwardly and meeting intermediate the rails when in active position, and for the purpose of illustration a structure of this character is shown; but as the gates are precisely alike except that they are arranged for operation in opposite directions the description of one will suffice for both.

The improved gates are mounted to swing upon horizontal shafts 10, journaled in bearings 11 upon the ties 12 and just outside the rails 13. Each gate consists of a primary arm 15, rigidly secured to the shaft 10, so as to move therewith, and a plurality of secondary bars 16, pivoted at 17 to the bar 15 and held in position by a keeper 18, and a rearwardly-extending bar 19, swinging from the shaft 10.

The free ends of all the bars are connected by a portion of flexible cable 20, as shown, the end of the cable being connected at 21 to a stop-post 22, disposed beyond the end of the tie 12 and preferably connected thereto by spaced bearing-plates 23.

The bars 15, 16, and 19 all lie side by side upon their respective stop-posts 22 when the gates are open, as shown in Figs. 1 and 2.

When the gates are to be closed, the shaft or shafts 10 are rotated to carry the primary arms 15 into vertical position, this action causing the keepers 18 to carry the secondary arms 16 with them, the momentum carrying the secondary arms past the center of the shaft in position to fall over between the rails 13, and they are held in uniformly-spaced position, as in Fig. 3, by the cables 20, the cables also causing the bar 19 to be elevated into the position shown in Fig. 3.

When the gates are to be closed, the motion of the shaft 10 is reversed, which will cause the arms 15 to again rest upon the stop-posts 22, and the arms 19 will also be returned to their position upon the posts, while a sufficient number of the secondary arms 16 will be carried over the center to carry the remainder into their former position.

Pivoted at 24 25, between pairs of the ties 12, are levers 26 27, extending inwardly and provided with arms 28 29, the latter pivotally united, as at 30, intermediate the rails 13 and below the lower line of the same. The outer ends of the levers are counterweighted, as at 31 32, and thus maintain the inner ends yieldably in elevated position. Guard-plates 39 are preferably disposed between the ties and extending beyond the same at the ends to protect the levers and the counterweights carried thereby. Disposed above each of the levers 26 27 and their connecting-bars 28 29 are platforms 33, having depending ears 35, connected, respectively, to the inner ends of the levers 26 27, so that the depression of the platform will correspondingly depress the inner ends of the levers simultaneously. Attached to each of the levers 26 27, beneath the shafts 10, is a member 36, having a slot 37 parallel to the lever, and formed in the shafts 10 are cranks 38, operating in these slots 37. By this arrangement when the platforms 33 are depressed the movement of the levers 26 27, caused thereby, will also cause the members 36 to operate the cranks 38 and rotate the shafts 10, and thus cause the closing action of the gates, as before described. As many of the systems of levers and platforms may be employed as required and arranged between a corresponding number of pairs of the ties 12 to extend the operating means to any required extent. The counterweights 31 32 wll have sufficient force to maintain the platforms 33 normally in elevated position and the gates in open position and to return them automatically to these positions when the platforms are released.

A railway-track provided with an apparatus thus constructed is effectually protected from intrusion by animals, as any attempt to pass along the line between the rails will cause the instant closing of the gates the moment the animals step upon any of the platforms, and the gates will remain closed so long as the animals remain upon the platform.

The device is simple in construction, can be inexpensively manufactured, and is accurate and certain in its action.

Having thus described the invention, what is claimed is—

1. In a cattle-guard, an arm pivoted to swing into vertical position, a plurality of secondary arms pivoted at one end to said primary arm near the pivot of the same, a flexible element coupling the free ends of all of said arms, and means for operating said primary arm to carry said secondary arms over the center for projection by gravity into active position.

2. In a cattle-guard, an arm pivoted to swing into vertical position, a plurality of secondary arms pivoted at one end to said primary arm near the pivot of the same, a flexible element coupling the free ends of all of said arms, a vertically-movable trip-platform, and means whereby the motion of said platform is communicated to said primary arm.

3. In a cattle-guard, a rock-shaft, a primary arm connected to said shaft and movable therewith, a plurality of secondary arms pivoted to said primary arm near said shaft, a flexible element coupling the free ends of all of said arms, means for operating said shaft to carry said primary arm into vertical position and carry said secondary arms over the center for projection into active position.

4. In a cattle-guard, a rock-shaft, a primary arm connected to said shaft and movable therewith, a plurality of secondary arms pivoted to said primary arm near said shaft, a flexible element coupling the free ends of all of said arms, a vertically-movable trip-platform, and means whereby the motion of said platform is communicated to said shaft.

5. In a cattle-guard, a rock-shaft, a support disposed adjacent to said shaft, a primary arm connected to said shaft and movable therewith and a plurality of secondary arms pivoted to said primary arm near said shaft and bearing upon said support when in open position, an arm swinging loosely upon said shaft, a flexible element connected at one end to said support and coupled consecutively to the free ends of said loosely-swinging arm, primary arm and secondary arms, and means for rotating said shaft to carry said primary arm into vertical position and carry said loosely-swinging arm and secondary arms into active position.

6. In a cattle-guard, a rock-shaft having one or more cranks, a primary arm connected to said shaft and movable therewith, a plurality of secondary arms pivoted to said primary arm near said shaft, a flexible element connecting the free ends of all of said arms, one or more vertically-movable trip-platforms disposed in the path of the appoaching animal, and coupling means between said platforms and cranks, whereby the depression of the platforms will actuate the shaft and move the arms into active position.

7. In a cattle-guard, parallel shafts mounted for rotation and provided with spaced cranks, a primary arm connected to each of said shafts, a plurality of secondary arms swinging from each of said primary arms, flexible elements coupling all the arms of each of said shafts, levers disposed in pairs and pivoted intermediately and extending beneath said shafts, coupling means between each pair of said levers, platforms movably connected to each coupled pair of said levers, counterweights at the outer ends of said levers, and slotted members upon said levers and engaging said cranks.

In testimony that I claim the foregoing as my own, I have hereto affixed my signature in the presence of two witnesses.

WALLACE E. DEMENT.

Witnesses:
G. H. WESTCOTT,
JNO. J. PINCKNEY.